Feb. 23, 1960 L. F. FRIEDL 2,925,638
FACED BLOCK MOLDING DEVICE
Filed May 26, 1955 4 Sheets-Sheet 1

Leander F. Friedl
INVENTOR.

BY
*Attorneys*

Feb. 23, 1960 L. F. FRIEDL 2,925,638
FACED BLOCK MOLDING DEVICE
Filed May 26, 1955 4 Sheets-Sheet 2
Fig. 2
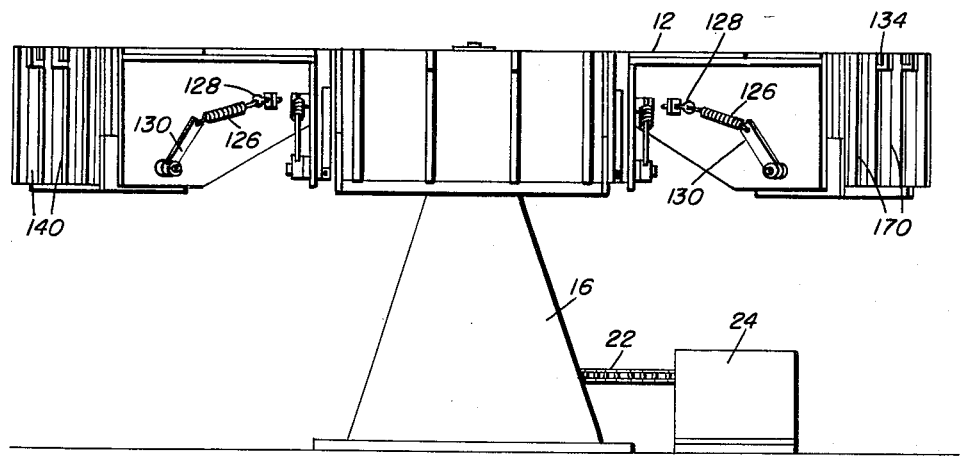
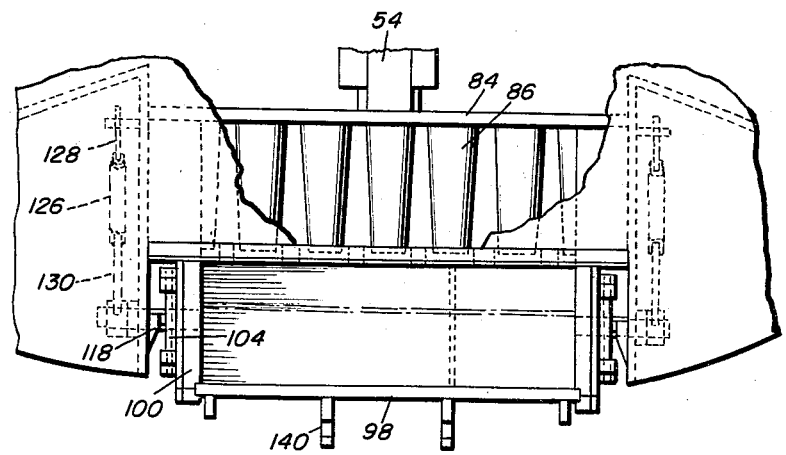
Fig. 5
Leander F. Friedl
INVENTOR.
BY *Clarence A. O'Brien*
*and Harvey B. Jacobson*
Attorneys

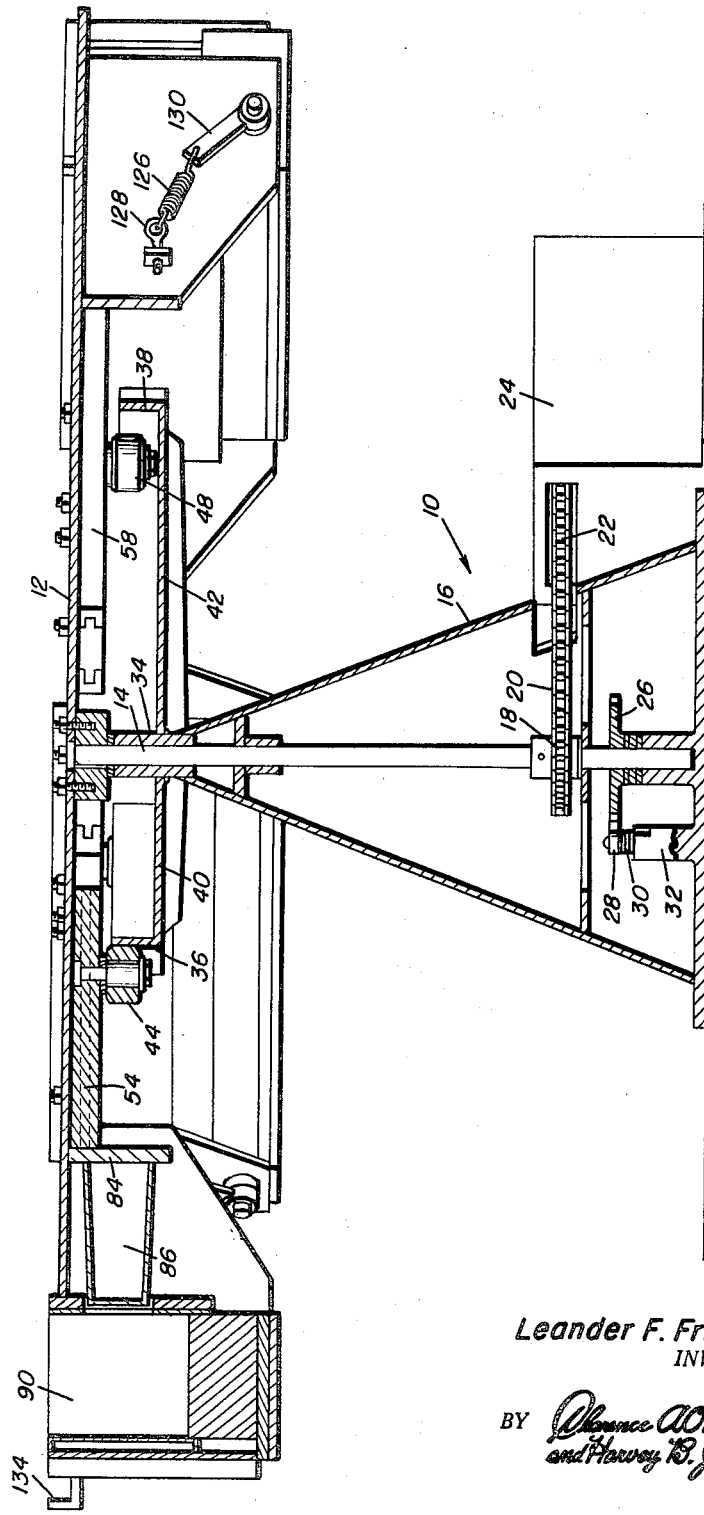

Feb. 23, 1960  L. F. FRIEDL  2,925,638
FACED BLOCK MOLDING DEVICE
Filed May 26, 1955  4 Sheets-Sheet 4
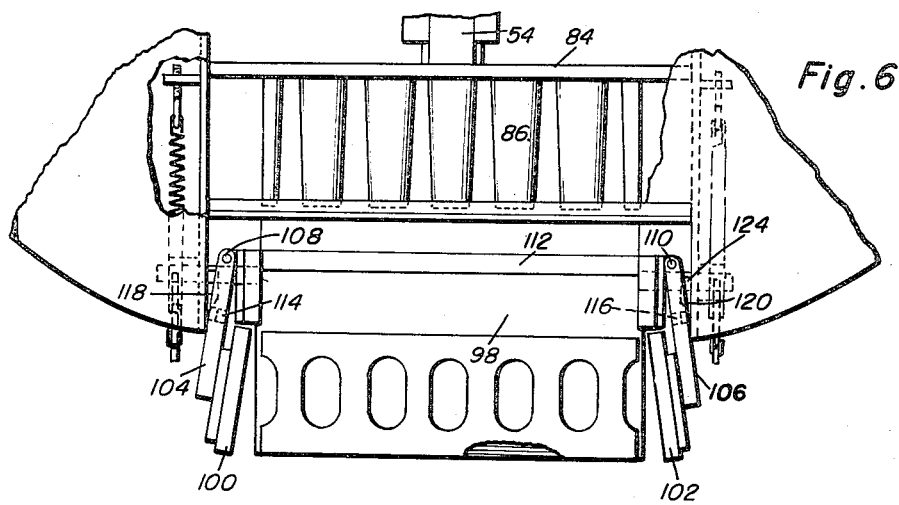
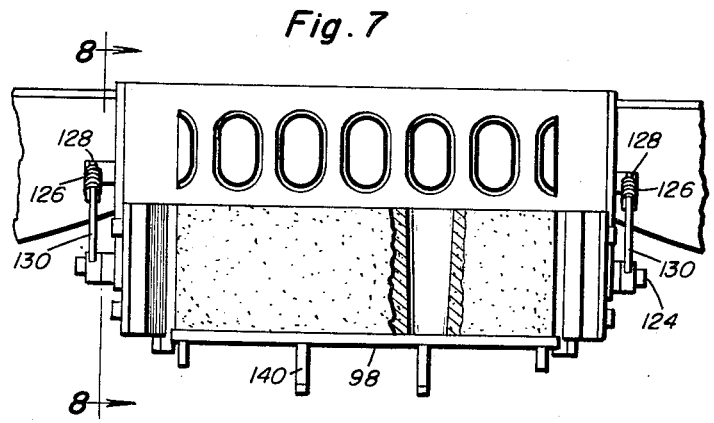
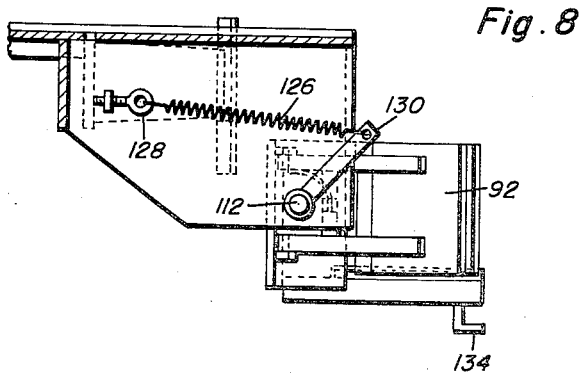
Leander F. Friedl
INVENTOR.

United States Patent Office 2,925,638
Patented Feb. 23, 1960

2,925,638

FACED BLOCK MOLDING DEVICE

Leander F. Friedl, North Judson, Ind.

Application May 26, 1955, Serial No. 511,236

2 Claims. (Cl. 25—66)

This invention relates to the class of molding apparatus and more particularly to a device for molding stone faced masonry units of various sizes, colors and shapes.

The primary object of the present invention resides in the provision of a machine adapted to produce cast stone faced masonry units of various sizes, colors, face reliefs, shapes substantially automatically in a highly convenient and efficient manner.

A further object of the invention resides in the provision of a faced block molding device which employs a plurality of mold boxes enabling various stages in the molding process to be carried on concurrently during the molding operation.

Still further objects and features of this invention reside in the provision of a molding apparatus that is comparatively simple in construction, substantially automatic in operation, relatively inexpensive to manufacture and utilize, and which is substantially fool-proof in operation, thereby enabling utilization for mass production of faced building units with a minimum of training necessary for the operators thereof.

These, together with the various ancillary objects and features of the invention which will become apparent as the following description proceeds, are attained by this faced block molding device, a preferred embodiment of which has been illustrated in the accompanying drawings, by way of example only, wherein:

Figure 2 is a side elevational view of the molding apparatus shown with the mold boxes in a raised position;

Figure 3 is an enlarged vertical sectional view as taken along the plane of line 3—3 in Figure 1 and illustrating in particular the construction of the means provided for rotating the turntable and illustrating the construction of the cams and rollers forming important elements of the invention;

Figure 5 is an enlarged plan view of the mold box and associated core assembly, with the core assembly being shown in a retracted position;

Figure 6 is a view similar to that of Figure 5 but illustrating the arrangement of parts with the core box in a rotated and lowered position;

Figure 7 is a side elevational view with parts of a block molded in the apparatus being broken away to show the openings formed by the cores in detail and further illustrating the mold box in a lowered position; and Figure 8 is a sectional detail view as taken along the plane of line 8—8 in Figure 7.

Figure 1:
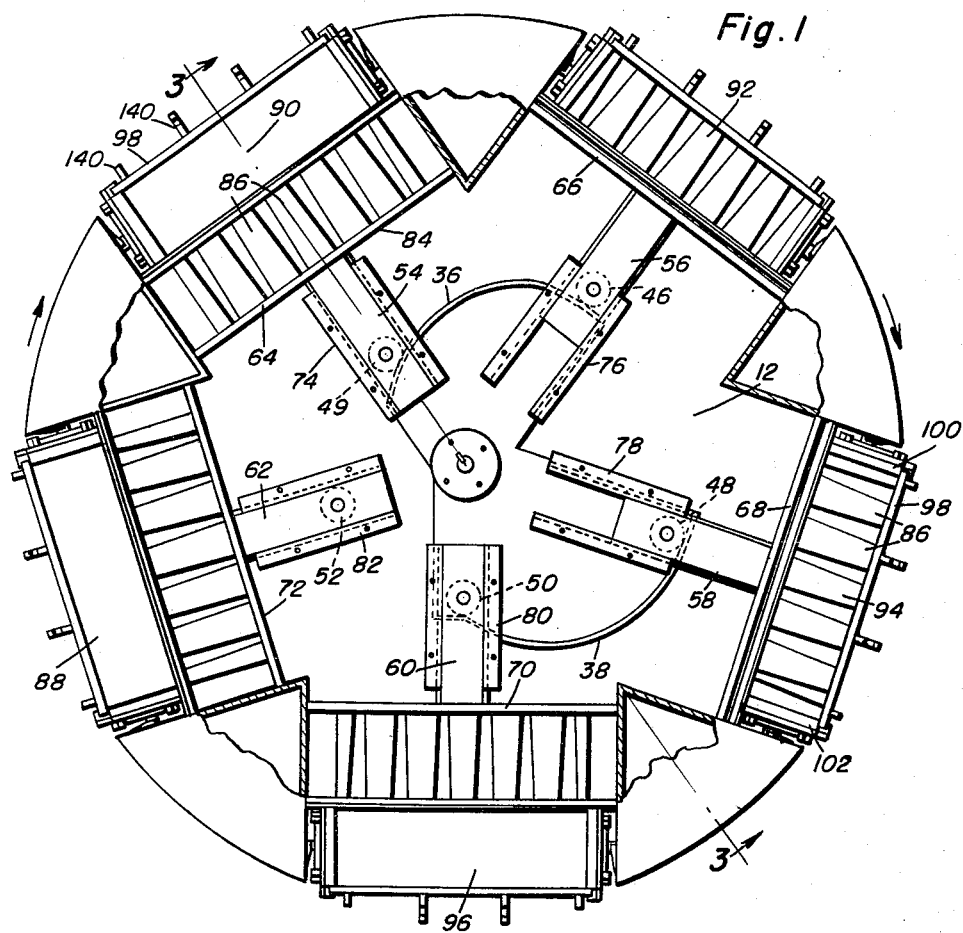
Figure 1 is a top plan view of the faced block molding device comprising the present invention.
Figure 4:
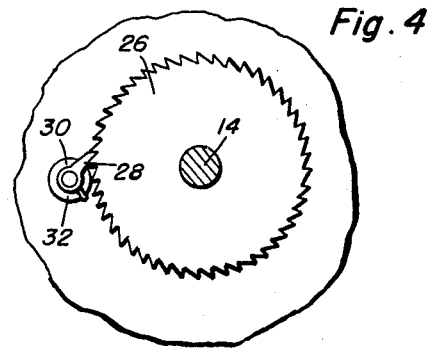
Figure 4 is a sectional detail view illustrating the construction of the means assuring one-way operation of the turntable.

With continuing reference to the accompanying drawings wherein like reference numerals designate similar parts throughout the various views, reference numeral 10 generally designates the molding apparatus comprising the present invention. This molding apparatus includes a turntable 12 mounted on a shaft 14 which is rotatably supported on a base 16. The base 16 may be in the form of a pedestal of conical shape. Mounted on the shaft 14 within the pedestal 16 is a gear 18 having a chain 20 trained therearound, the chain 20 being also entrained about a gear 22 connected to a suitable driving motor assembly 24. In order to assure one-way operation of the turntable 12, a toothed wheel 26 is mounted on the shaft 14 and is engaged by a pawl 28 which is spring pressed, as at 30, the pawl being suitably mounted on a stud 32.

Carried by the rigid bearing block 34 affixed to the base 16 are a pair of cams 36 and 38 of arcuate configuration and held in place outwardly of the shaft 14 by supports 40 and 42. The cams 36 and 38 are adapted to be successively engaged by the rollers 44, 46, 48, 50 and 52 depending from the core sliding bars 54, 56, 58, 60 and 62 of core assemblies indicated at 64, 66, 68 and 70. The core sliding bars are slidably mounted within guides 74, 76, 78, 80 and 82 mounted on the turntable 12.

Each of the core assemblies is of substantially identical construction, and therefore, only one of the core assemblies need be specifically described.

The core assembly 64 includes a core mounting bar 84 to which the various core pieces 86 are affixed, the core pieces being adapted to be slid into the pivotally mounted mold boxes 88, 90, 92, 94 and 96, all of which are of substantially identical construction. The mold box 92 includes a pallet 98 having detachable end mold pieces 100 and 102 engaged therewith and which are carried by members 104 and 106 pivotally attached, as at 108 and 110, to the mold box base 112. Cam engaging members 114 and 116 are adapted to engage wedges 118 and 120 which are provided for holding the mold boxes in a closed condition when they are in a raised position. The mold boxes are pivotally mounted on shafts as at 124 and are normally spring urged into a closed position by means of a pair of opposed springs 126 terminally connected to adjustable eyes 128 and to levers 130 mounted on the shafts 112 which are rotatable with the mold boxes. A hook 134 is affixed to the mold boxes for engagement so as to enable the mold boxes to be pulled into a lower position.

The molding apparatus 10 is primarily designed to produce a cast stone faced masonry unit. This requires two or more aggregates and the traveling mold boxes. The cycle of operation of the invention may begin, for example, in a station such as that at which mold box 88, as is shown in Figure 1, is located. An operator may be positioned here and after cleaning and oiling the mold box and mold as may be necessary, and after insertion of the pallets as at 98, the mold boxes being provided with pallet support bars, as at 140, the suitable faced mold plate for providing the desired configuration may be introduced and the end mold plates 100 and 102 may be changed as desired. Then, due to the rotation of the shaft 14, the turntable will move to the position at which the mold box 90 is shown in Figure 1. At this station, a specially designed automatic machine, not shown, will insert colored cast stone aggregate and will insert uncolored strengthening cast stone aggregate in controlled amounts and densify the aggregate by tamping.

During the travel to the station, the roller 46 will have engaged the cam 36 to move the core into the mold. Then, subsequent rotation will cause the turntable to attain the position as is shown in Figure 1 as having been attained by the mold box 92. At this station, colored cast stone aggregate may be inserted by an operator against the end mold when forming blocks for jambs and corners, and this colored cast stone aggregate may be densified by tamping. When the turntable has reached the position as is shown by the core box 94 in Figure 1, lightweight aggregate or other desired backing may be introduced by a specially designed automatic machine, and this backing aggregate may be densified by governed tamping, and the masonry unit may be compressed. During travel to the station as is shown by the mold box 96 in Figure 1, the roller 50 will engage the cam 38 to withdraw the core pieces. At this station, a specially designed automatic machine will open the core box by contacting the hook 134 and extract the masonry unit on the pallet 98 and clean the mold box by controlled and directed air pressure while governing the rate of closing of the mold box which is under spring tension from the springs 126.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A molding apparatus comprising a base, a shaft rotatably mounted in said base, means for rotating said shaft connected thereto, a turntable on said shaft, a plurality of mold boxes carried by said turntable, core assemblies slidably mounted on said turntable, and means for moving the cores into and out of said mold boxes synchronized with the rotation of said turntable, said mold boxes being pivotally mounted on said turntable, and resilient means for urging said mold boxes to a position adapted to receive the cores of said core assemblies, said core moving means including core mounting bars having core sliding bars attached thereto and engageable in guides carried by said turntable, rollers carried by said core sliding bars, and cams fixed to said base and engageable by said rollers, said cams being arcuate strips, the rollers successively engaging the outer surface of one of said strips and the inner surface of the other of said strips, said mold boxes including a back fixed to said turntable, and having apertures therein for the reception of said cores, a bottom, a pallet connected thereto, ends pivotally connected to said bottom, means connected to said turntable pivotally mounting said mold box on said turntable for movement from a first position whereby said pallet is vertically disposed to a second position whereby said pallet is horizontally disposed, means associated with said ends for holding the latter firmly to the remainder of the mold box when in the first position and for allowing the ends to pivot away when the box is in the second position whereby easy removal of a masonry unit will be facilitated.

2. A molding apparatus comprising a base, a shaft rotatably mounted in said base, means for rotating said shaft connected to said shaft, a turntable on said shaft for rotation with said shaft, a plurality of mold boxes carried by said turntable, a core assembly for each of said mold boxes slidably mounted on said turntable, means for moving said core assembly into and out of said mold boxes in synchronized relation with rotation of said turntable, said mold boxes being pivotally mounted on said turntable for movement between a first closed position and a second open position whereby the molded unit may be easily removed from said mold box, and resilient means connected to said mold box for resiliently urging said mold boxes to said first position for the reception of said core assemblies, each of said core moving means including a core mounting bar, a core sliding bar for each of said core assemblies, each of said core sliding bars being attached to a respective one of said core mounting bars and engaged in a guide carried by said turntable, a roller carried by said core sliding bar, and a pair of spaced cams fixed to said base and engaged by said rollers, said cams being in the form of arcuate strips, said rollers successively engaging the outer surface of one of said cams and the inner surface of the other of said cams.

References Cited in the file of this patent

UNITED STATES PATENTS

| | | |
|---|---|---|
| 752,644 | Deforest et al. | Feb. 23, 1904 |
| 809,901 | Blake et al. | Jan. 9, 1906 |
| 840,006 | Miller et al. | Jan. 1, 1907 |
| 1,056,059 | Rickman | Mar. 18, 1913 |
| 1,139,971 | Heckert | May 18, 1915 |
| 1,442,122 | Brown | Jan. 16, 1923 |
| 1,469,820 | Ruby | Oct. 9, 1923 |
| 1,595,369 | Wasmer | Aug. 10, 1926 |
| 1,659,987 | Benson et al. | Feb. 21, 1928 |
| 1,701,438 | Baum et al. | Feb. 5, 1929 |
| 1,875,644 | Nelson | Sept. 6, 1932 |